US008341525B1

(12) United States Patent
Achour et al.

(10) Patent No.: US 8,341,525 B1
(45) Date of Patent: Dec. 25, 2012

(54) SYSTEM AND METHODS FOR COLLABORATIVE ONLINE MULTIMEDIA PRODUCTION

(75) Inventors: Maha Achour, Encinitas, CA (US); Samy Achour, Encinitas, CA (US); Douglas Anarino, Bellows Falls, VT (US)

(73) Assignee: Starsvu Corporation, Encinitas, CA (US)

( * ) Notice: Subject to any disclaimer, the term of this patent is extended or adjusted under 35 U.S.C. 154(b) by 13 days.

(21) Appl. No.: 13/283,575

(22) Filed: Oct. 27, 2011

Related U.S. Application Data

(60) Provisional application No. 61/626,654, filed on Sep. 30, 2011, provisional application No. 61/514,446, filed on Aug. 2, 2011, provisional application No. 61/498,944, filed on Jun. 20, 2011, provisional application No. 61/493,173, filed on Jun. 3, 2011.

(51) Int. Cl.
*G06F 17/00* (2006.01)

(52) U.S. Cl. ......... 715/716; 715/201; 715/700; 715/723

(58) Field of Classification Search .................. 715/716, 715/719–723, 750–753
See application file for complete search history.

(56) References Cited

U.S. PATENT DOCUMENTS

| | | | |
|---|---|---|---|
| 7,774,819 | B2 | 8/2010 | Perez |
| 7,782,363 | B2 | 8/2010 | Ortiz |
| 7,836,389 | B2 | 11/2010 | Howard et al. |
| 2006/0064644 | A1* | 3/2006 | Joo .............................. 715/751 |
| 2008/0086752 | A1 | 4/2008 | Perez |
| 2009/0094039 | A1* | 4/2009 | MacDonald et al. ............. 705/1 |
| 2009/0164902 | A1* | 6/2009 | Cohen et al. .................. 715/716 |
| 2010/0289900 | A1 | 11/2010 | Ortiz |

OTHER PUBLICATIONS

A Digital Video Advertising Overview, http://blog.boom.ro/documente/pdf/Digital-Video-Advertising.pdf, 2011, pp. 5-10.
http://www.moviemasher.com/doc/, downloaded Oct. 26, 2011, all pages.
http://www.xtranormal.com/about__us/, downloaded Oct. 26, 2011, all pages.
http://www.plotbot.com/, downloaded Oct. 26, 2011, all pages.
Creating Online Learning Activities: Tools, IUPUI Center for Teaching and Learning, 2011, http://ctl.iupui.edu/common/uploads/library/CTL/CTL512429.pdf, all pages.
Distributed Video Production—DVPACTS AC 089, Yann Orlarey, Olivier Carbonel (Grame), Dimitri Konstantas (CUI), Simon Gibbs (GMD), pp. 1-11.
How to Use Online Video to Increase Sales, Ivana Taylor, Publisher of www.DIYMarketers.com, 2010, pp. 3-10.
Open video tools to support the production of online collaborative . . . , http://openaccess.uoc.edu/webapps/o2handle/10609/5063 pp. 4-12.
http://www.apple.com/ilife/imovie/what-is.html, 2011, all pages.
http://www.adobe.com/products/premiere/features.html, 2011, all pages.
Online Video "Dashboard," 2006, http://www.ptv-agc.org/06RoundRobins/09__downing__dashboard.pdf, all pages.

* cited by examiner

*Primary Examiner* — Cesar Paula
*Assistant Examiner* — Quoc A Tran
(74) *Attorney, Agent, or Firm* — Anatoly S. Weiser, Esq.; Acuity Law Group

(57) ABSTRACT

A digital multimedia platform available to a plurality of collaborators of a video project through a networked computing system maps script information to a timeline, allowing contributions to be mapped to the timeline for inclusion in the project. One embodiment includes a tools module, an authentication module, a compilation module, and a script writing tool. The tools module enables editing of a multimedia project by collaborators. The authentication module assigns roles and privileges to collaborators. The compilation module receives files and information from collaborators to the multimedia project. The script writing tool implements edits to a script file associated with the multimedia project.

17 Claims, 17 Drawing Sheets

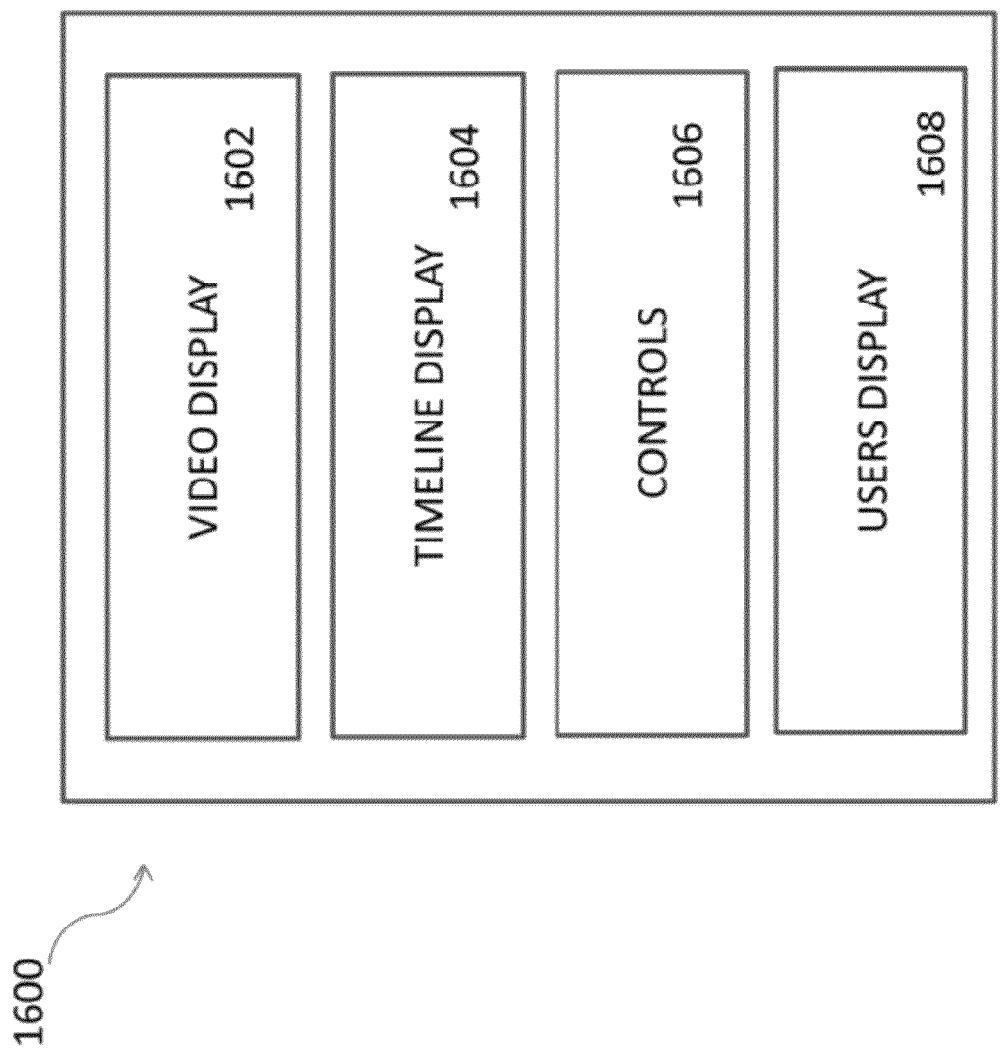

SYSTEM AND METHODS FOR COLLABORATIVE ONLINE MULTIMEDIA PRODUCTION

RELATED APPLICATIONS

This application claims priority from the U.S. Provisional Patent Applications listed below:
1. U.S. Provisional Application Ser. No. 61/493,173, filed on 3 Jun. 2011, entitled System and Methods for Distributed Multimedia Production, Maha Achour and Samy Achour, inventors; and
2. U.S. Provisional Application Ser. No. 61/498,944, filed on 20 Jun. 2011, entitled Systems and Methods for Distributed Multimedia Production, Maha Achour and Samy Achour, inventors.
3. U.S. Provisional Application Ser. No. 61/514,446, filed on 2 Aug. 2011, entitled System and Methods for Collaborative Online Multimedia Production, Maha Achour and Doug Anarino, inventors.
4. U.S. Provisional Application Ser. No. 61/626,654, filed on 30 Sep. 2011, entitled System and Methods for Collaborative Online Multimedia Production, Maha Achour and Doug Anarino, inventors.

All of the above-listed patent documents are incorporated herein by reference in their entireties, including figures, tables, claims, and all other matter filed or incorporated by reference in them.

FIELD OF THE INVENTION

This disclosure is related to the field of collaborative online video production applications, and in particular, a multimedia system for video productions with embedded script and commands.

BACKGROUND

Many of today's multimedia tasks are performed using audiovisual capturing tools to generate content that is then fed to expensive and sophisticated centralized editing and composing systems for titling, sequencing, super-positioning, effects generation and rendering before final release. Such a centralized approach discourages distributed multimedia production techniques and do not facilitate content feeds generated by professional and amateur entertainers, artists, media creators, and producers distributed across the globe. This is particularly the case with current video production systems where the script is a manuscript separate from the video creation process.

By using conventional video editors to implement an online video production application, the production team tasks are not balanced among users as the editor bears the most challenging and time-consuming tasks. Additionally, the production crew still needs to be present during video shoots. For instance, editors typically perform a variety of tasks in processing videos uploaded by crew members, including, but not limited to, (i) remove the green or blue screen and smooth the edges trim the video and adjust the video length in compliance with the script and/or producer/editor requests; and (iii) identify each video and associate it with its corresponding scene or shot within the video editor timeline.

With the emergence of online video content distributions, many amateur artists have attempted to produce their own videos using hardware and software tools available to them. Such approaches not only require having access to these systems and learning how to use them but also require that all video elements—from actors and background setup to sound and effects—be present in the same location and at the same time. Such stringent requirements are difficult to accommodate when scriptwriters, producers, actors, cameramen, stage artists, and musicians are working asynchronously wherever they happen to be at the time. Hence, there is a need for a systematic mechanism by which videos are seamlessly placed directly in the video editor timeline after removing the green and/or blue backgrounds. Similarly, multiple users may decide to collaborate in real-time on complex scenes, layered storyline, or live feeds. Furthermore, mobile applications of this novel web application (App) may be downloaded on mobile devices to notify users about a new or ongoing video production in their current geographical locations to upload specific videos, background screen, news shots, sounds, music, cover events, collaborative storytelling, and so forth. Or, users may initiate a production triggered by advantageous situations. For example, major news, social, or personal events in specific location will notify all or pre-selected users using such mobile app to collaborate on scripting, shooting, editing, and producing videos on the fly.

BRIEF DESCRIPTION OF THE FIGURES

FIG. 16 illustrates a mobile device display, according to an example embodiment.

DETAILED DESCRIPTION

Figure 1:
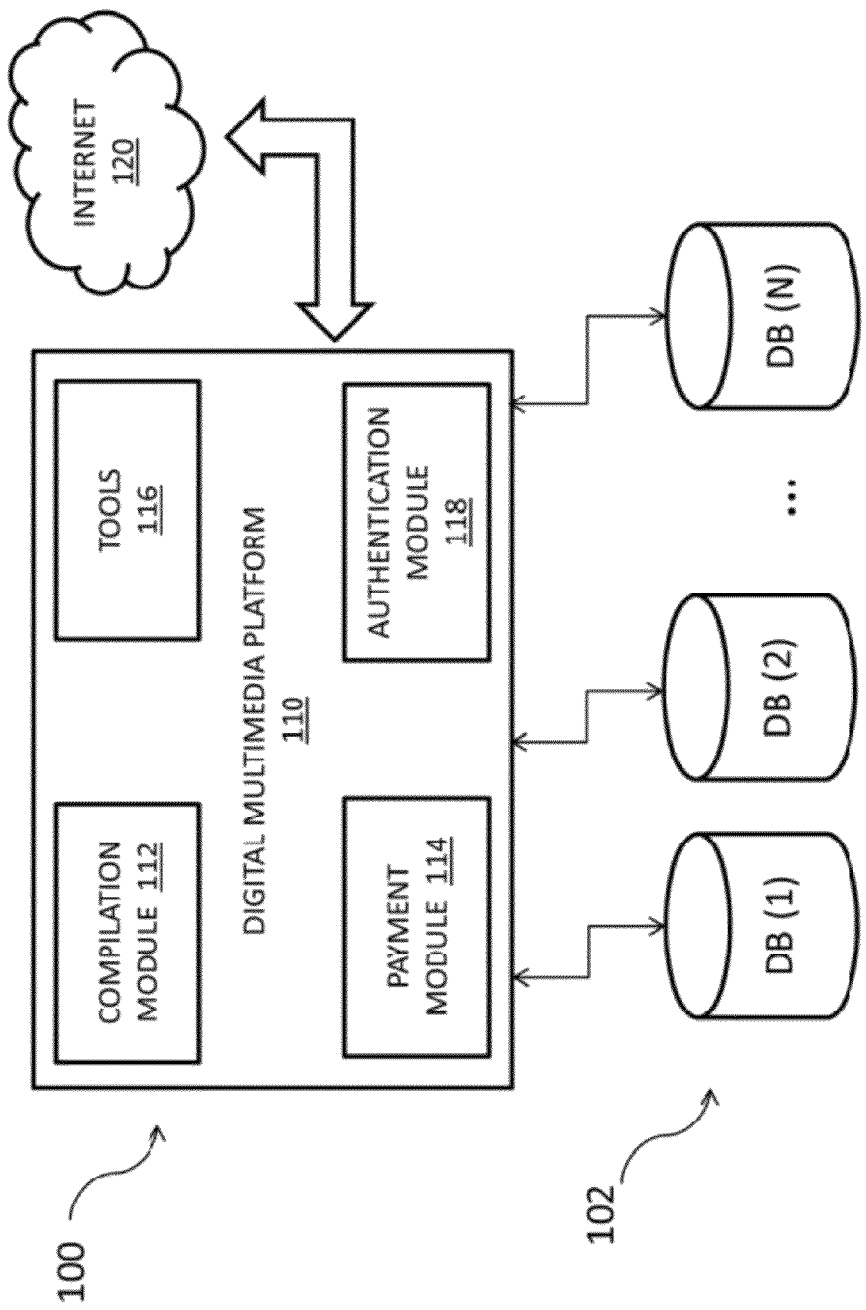
FIG. 1 illustrates a Distributed Multimedia Production (DMP), according to some embodiments.

Presented herein is a novel platform that alleviates such requirements by opening up the video creation, production, and distribution process to a collaborative process. Such methods and applications may be used to democratize digital video processes and thus empower a whole new generation of artists, writers, content, and markets by exponentially increasing the number of professional and amateur video creators and industry players contributing to the whole video digital content and economy. Unlike conventional online video editors, online video production communities using this novel web application have interaction with script writers. Hence, the script is seamlessly embedded into the video editor to simplify the production process and balance production roles among users. Eventually, diverse global user communities may be formed that include a variety of participants, such as students, writers, actors, cameramen, artists, filmmakers, musicians, educators, journalists, travelers, activists, sports enthusiasts, and bloggers. Such a novel production environment enables practically anyone who wants to create original video content. Furthermore, the script may encompass placeholders, command lines, and producer/editor comments to automatically upload videos captured by socially connected users into the pre-assigned slots in the video editor timeline to enable collaborative storytelling and make video production a social experience. These users may do so by using the App version on their mobile devices. Such novel platform creates aggregate value by offering an environment for collective efforts and collaboration instead of today's tiny and disconnected individual efforts or expensive and inflexible production studio styles. This "Community-Driven" web application also brings together amateur, professionals, and celebrities, where feedback or cameo appearances by celebrities and professionals may be the ultimate reward to amateur users.

A mobile App has both client side portion and software on network servers which receive a plurality of video, audio, images, commands, text, and comments data streams from a plurality of mobile stations to produce videos on the fly or in a time delayed fashion. Users may select to keep copies of their own files on their mobile device. Unsophisticated users may configure their mobile App from a pre-selected menu to setup the complete or a portion of the simplified video production portal application from both the client and server sides depending on their roles in the production process. For instance, a football event may trigger a video project where users are scattered around the football field. Production owner uses the script tool to create scenes and shots using script tool, where scenes my represent the quarters in the game, introduction, summary, best plays, highlights, key players, and so forth. Actors are now cameraman using their mobile devices to follow the script. Mobile App will be configured based on their role and will allow them to simultaneously view video shots to interchange roles on the fly depending on game progress.

In some embodiments, a system 100, as illustrated in FIG. 1, includes a Distributed Multimedia Production (DMP) platform 110 communicatively coupled to the Internet 120 and one or more databases, DB(1), D(2), . . . DB(N) 102. These system elements may be distributed among a collection of servers located around the globe. The configuration of system 100 allows collaborative processing incorporating multiple distributed participants. The DMP 110 enables a new generation of socially-connected professionals and amateurs to collaborate on high-quality video productions. Participants are able to work together in the process of generating the video, as well as to make the resultant work available online and accessible to mobile devices. The collaborative and distributed type web applications described herein provide online tools to write scripts, add commands, shoot videos, edit, produce, market, and distribute quality videos in a systematic, flexible, seamless, and simple way so as to make each user's experience enjoyable, rewarding, and exciting.

In one example the DMP platform 100 is a collaborative web application having modules for compiling a composition, authorizing users, providing tools to users, and payment or subscription processing. Other modules may be added as a function of the capabilities and desires of the collaborators. The DMP platform may be implemented as a cloud service, where functions are provided as a networked solution. The DMP platform may be implemented as distributed modules, where software is downloaded or otherwise provided to the collaborators. The modules of DMP 110 include tools 116 which provide applications and utilities for each of the users. These tools 116 will typically include tools specific to the functions performed. In this way, tools 116 may include a set of tools for authors, a set of tools for videographers, a set of tools for editing, a set of tools for compilation, and other functions. The tools 116 may further provide access to other applications which are not included in the DMP 110 but are available through a networked connection, such as Internet 120. In some examples, participants are able to access external applications and tools, such as third party applications or Tools as a Service (TAS) applications, whereby, tools 116 may interface with Application Programming Interfaces (APIs) seamlessly. In this way, the participant may select the feature or application desired, and tools 116 will set up the connection automatically and allow access to the application.

Users may access tools 116 according their role or identify, as well as according to the production arrangement. The tools may be provided as services or may be downloadable as widgets for use at the collaborators computing or mobile device. The tools 116 may further provide interfaces and APIs to the user for interfacing with external devices, such as cameras, lighting equipment, sound equipment, digitizing devices, website, other resources and software programs. The tools module 116 may further provide drivers for control of external devices and software desired for use on the collaborative project. The tools module 116 maintains these various mechanisms and works in cooperation with the other modules within DMP 110, such as the authorization module 118, compilation module 112, and payment module 114.

The compilation module 112, according to some embodiments, allows users to build the multimedia work by compiling the various components generated and contributed by each of the collaborative users. The compilation module 112 processes uploaded files and video to allow fast online processing. For instance, characters, scenes, shots within scenes, commands, dialogues, actions, and comments are created and included during the script writing process to build videos initial structure. Such structure is automatically integrated into video editor timeline. Comments may be part of the shot metadata that users, specifically actors and cameraman, can input to describe building blocks of elements used to create the scene such as type of furniture, clothing, jewelry, accessories, and so forth, to enable viewers to select these items while watching the video to determine vendors selling these items online, in stores, or in nearby stores depending on user's location. This embedded advertising becomes part of the revenue models for this novel web application. Furthermore, high-quality videos are converted to low-resolution files during the upload process to enable users to edit them on the fly, green or blue background screens are automatically removed, and videos are trimmed to assign each trimmed video file to its corresponding slot in the video editor timeline After the video editing process is complete, the compiler renders the video to its original high quality resolution for online, broadcast, or cable distribution. Information included in the script, such as characters, scenes, shots within scenes, commands, dialogues, actions, and comments, may be integrated with the video during the rendering process to provide keywords and descriptions that may be used to promote the video, associate relevant commercials and advertisement during viewing, and help search engines identify clips within the video. This data may be stored in a new format with the video data, or may be stored in a separate file mapped to the video data. A web application may include HTML and style sheet documents, which provide the graphics and look of the webpage, which are downloaded to users' drive and cached. It may also include text files, which are validated by the browser, such as XML, java, flash or other files. The authorization module 118 identifies users by identity, such as by roles or contribution, and applies rules for processing and enabling operations. The authorization module 118 assigns and monitors rights are based on a processing scheme. In some embodiments the processing scheme is predetermined prior to starting a collaborative project or work. In some embodiments the processing scheme may be dynamically modified by an administrator. The authorization module 118 works in coordination with the payments module 114 to bill participants and to verify payment for each collaborative process according to the processing scheme. The payments may be based on collaboration parameters, such as by data content or by time used. Further, the payment module may enable a profit-sharing or other arrangement. The payments module 114 provides the payment status information to the authorization module 118; in response, the authorization module 118 may enable or prohibit users with respect to the various functions of the DMP 110.

The DMP 110 may be further offered as a cloud service, such as Software as a Service (SAS). In such an environment, the DMP 110 platform may upgrade the various modules without interruption or action by the users. The collaboration of users is then facilitated through the cloud service(s), enabling collaborators to work together asynchronously but with the most recent versions and information. The cloud service may access other information available through the Internet, and may also access proprietary databases of the collaborators. Where the service is provided as a platform or application in the cloud, the service is then available for easy access from any device having capability to access the Internet or network. The ability to collaborate from anywhere provides users with enhanced flexibility. Similarly, multiple users may decide to collaborate in real-time on complex scenes, layered storyline, or live feeds.

The DMP 110 may be used for Internet productions and publications, such as video and TV applications available at sites on the web. The DMP 110 is configured for use and communication with Internet protocols. The DMP 110 may post or publish video content and monitor its use and viewing statistics. This information may be used as feedback in further development of a given project or as survey type information for future projects. The DMP 110 may be used to create casting calls or review screen play snippets. This may extend to film festivals for coordination and planning of events.

Individual films may be created on or provided to the DMP 110, for review, scheduling and selection by a film review committee. In this scenario, the reviewers could provide critique and edits to the film, having ability to manipulate scene information. This is available as the project is configurable by the DMP 110.

Some Examples of DMP Systems

In some examples, a DMP 110 eliminates costly tools, equipment and royalties by providing or recommending video capture kits with camera, microphone, green screen, lights, and so forth, as well as providing royalty free stock footage and soundtracks. The DMP 110 enables asynchronous shots taped by actors to be assembled into a single shot within a scene, in accordance to script information, to provide streamlined production processes. The production processes provides simple writing tools which expands an idea to a detailed screenplay. Further, the DPM 110 provides powerful editing tools to layer video elements, incorporate and modify video and audio elements, title and subscript scenes, add effects and transitions into a high-quality video production. Similarly, multiple users may decide to collaborate in real-time on complex scenes, layered storyline, or live feeds.

In one example, social networking tools allow writers, producers, actors, cameramen, and artists to collaborate and share work at any stage using a computing or mobile device. Such a collaborative platform may be used to create videos including short videos of offbeat comedy skits, spoofs, training videos, commercials, infomercials, documentaries, full length movies. In some examples these collaborations may produce videos of short duration, less than ten minutes, or long durations. The collaborative platform accommodates multiple contributors. A producer, writers, editors, actors, cameramen, artists, musicians, sound engineers, and others may all participate and contribute at different stages of the video production. The roles of the participants may include producers, writers, actors, cameramen, engineers, editors, and so forth.

In some embodiments, a producer is an authenticated owner of a particular production having ultimate control over its metadata, access rights, scene releases and credits. The producer may post a call for writers, actors, cameramen, or others for the project. The producer selects and authenticates writers, actors and other participants. Writers are authenticated users granted access to a page for editing the script, referred to as the Edit Script page, for a particular scene or all scenes in a production. There may be multiple writers for a single project. The writers may have a partition that allows them to collaborate among themselves prior to posting their writings for viewing, critique, and learning by others. Once the writings are so posted, an editor or producer will review, comment and revise the writings. Script may include characters, scenes, shots within scenes, commands, dialogues, actions, and comments. An editor is an authenticated user granted access to a page for editing the video, referred to as the Edit Video page, for a particular scene or all scenes in a production. The actors then act out the writings, or script; the actors are authenticated users having a defined character role in a particular scene and therefore are granted access to a page to upload clips, referred to as the Upload Clip page, for that scene. Actors may include celebrities providing cameos which may be integrated into the video project. An artist is an authenticated user given the task to generate background images and videos for given scenes when directors/editors cannot identify suitable ones in the application database. Engineers and musicians are authenticated users given the task to generate sound effects, video effects and music for given scenes when directors/editors cannot identify suitable ones in the application database. Administrators are DMP personnel having access to certain editorial functions. Super Administrators are DMP technical personnel having access to user accounts and low-level functions, as well as having control to configure the DMP according to a processing scheme.

When a production is first created, its producer (or potentially the owner) has access to many functionalities, including multiple access rights, but they can also assign those rights to other users. The access rights include:

a) Script Viewing: ability to view scene scripts (can be public).
b) Commenting: ability to comment on scenes
c) Script Writing: ability to create scenes, shots within scenes, and edit their scripts and character roles, add commands, dialogues, actions, and comments.
d) Editing: ability to sequence uploaded clips, add effects, titles, transitions within the editor
e) Upload: general file upload rights, which may include green or blue background removal, video trimming, and linking files to their corresponding slots within the video editor timeline
f) Casting: ability to assign users to character roles The DMP 110 supports a variety of processing functions, some of these are detailed below according to an example embodiment.

Script Editor

Figure 2:
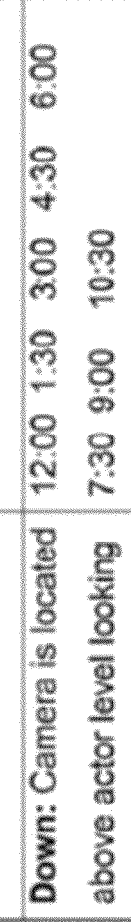
FIG. 2 illustrates a table of various camera locations with respect to an actor's positions and the corresponding angles, scenes, layers, according to some embodiments.

This function is based on the type of user and currently selected element. Below are few of the types of script elements supported:

1. Shot—a single camera angle
    i. Horizontal slider: angles from −90° (left) to 90° (right)
    ii. Vertical slider: angles from −90° (down) to 90° (up)
    iii. Depth of View slider: values −10 (wide angle) to 10 (closeup)
    iv. Transition to next shot (optional)
    v. Suggested length: auto checkbox allowing override of length field only if this scene has not yet had its video edited
2. Action—direction for movement of a single actor
    i. Character selection menu
    ii. Start position selector (clockface)
    iii. End position selector (optional)
3. Dialog—lines to be delivered by a single actor
    i. Character selection menu
    ii. Delivery extension field
4. Command and comment lines
    i. Placeholders for videos uploaded by social media users
    ii. Marketing material
    iii. Users comments Lighting settings may be set in a similar way without being the same as actor/camera settings. FIG. 2 illustrates a table depicting an actor's positions and angles with respect to their own camera/green screen and to each other. Such guidelines may be integrated with the script to facilitate the video production process.

In developing a production, a script writer may include additional fields to enable seamless integration with video editor and to allow actors to easily determine how to shoot and time their videos. FIG. 2 illustrates an example scenario of a frame 200 having multiple fields.

A timeline track displaying information from the script alongside the actual clips being tied together may be used as a control, but moves in tandem with the actual time line content as it's zoomed and scrolled (like the Ruler control). For instance, an editing panel may appear when a shot clip is selected in the timeline, offering the following elements:

1. Background continue toggle allows for the background clip from the previous shot clip to just be continued
2. Background drop well, visual clips can be dragged here to indicated background if toggle is selected
3. Character menu lists characters appearing in the selected shot and controls content of the elements:
    a. File selection media browser displays just the takes uploaded by the character's user for this shot, so one can be selected
    b. Layer button set offers ability to send character frontwards, backwards, to the front or to the back
    c. Trim control allows trimming of selected file from beginning or end
    d. Offset control allows incremental resequencing of selected file
    e. Hue, saturation, contrast and brightness slider controls
    f. Position control allows character to be moved onscreen
    g. Resize control allows character to be sized onscreen New Functionalities and Payment Scenarios The collaborative online video production application and its associated payment stream models. These new types of online payment streams are based on the application ecosystem ranging from the collaborative environment, video content, talented users, target audiences, to partners. In some embodiment, the payments module 114 calculates fees for accessing talents promoted by the application. Access may be by internal or external users/consumers. For instance, a producer may want to hire a video editor, script writer and actors to manifest their vision for a production. The payments module 114 may further incorporate a payment transaction charge as a flat rate, one-time payment, royalties, or a full license to the application. Subscriptions may be implemented to provide different rates to groups and video production channels of relevance to the consumer. A reward program may be implemented by ranking videos and types of users. A reward program may consist or linked to points collected by users depending on their contributions and or revenue generated by their videos. In one embodiment the DMP 110 matching users with each other or with the consumer, branding videos to further promote very successful (viral) videos.

The DMP 110 may be used for engagement and interactivity with the audience, such as fans, sponsors, partner, and so forth. The system 100 further allows for partnerships with third party distributors, vendors, and services. The DPM further provides expanded access to royalty-free stock content library and to effects, transitions, themes and so forth.

Figure 3:
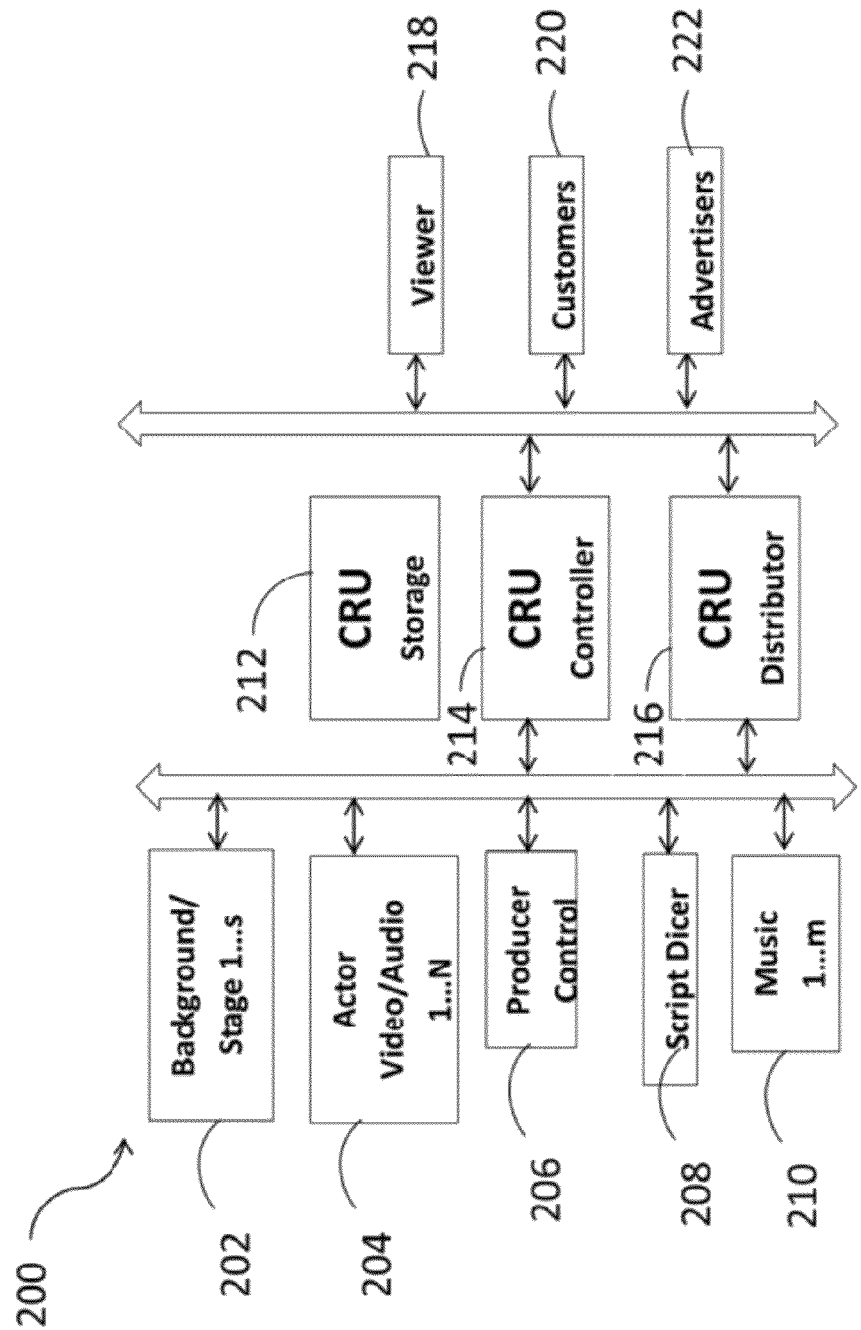
FIG. 3 illustrates an example of a hierarchy between application and user interfaces, according to some embodiments.

Some embodiments implement transaction fees for payment transfers between accounts. Advertising may be displayed on the DMP site and in correspondence, with the ability to block ads on the site and in correspondence. Advertising returns may be applied by the payments module 110 where site content is displayed or otherwise used on third party sites and services, and wherein the ability to retain or regain ownership of user content is provided through the DMP 110. Further, the DMP 110 may be used to account for and process hosting fees for podcast channels The following describes a video production system 200, illustrated in FIG. 3, which distributes video production so as to satisfy requirements of collaboration among script writers, producers, actors, cameramen, stage artists, and musician are scattered all around the globe and may be unaware of each other's presence. In this embodiment, an online produCtion of distributed mUltimedia tool referred to as a CRU or CRU tool, alleviates many of the video production challenges by opening up the video creation, production, and distribution process to a group of users, and may even open the process to the general public. The CRU tool democratizes the digital video process to empower a whole new generation of artists, writers, contents, and markets by exponentially increasing the number of professional and amateur video creators and players contributing to the whole digital video content and economy. The CRU platform 212 includes a variety of elements and functionalities. As illustrated in FIG. 3, the system 200 includes multiple CRUs 212, 214, 216, each coupled to multiple environments. The CRUs are coupled to environments including a viewer interface 218, customer interface 220, and advertiser interface 222. The CRUs are further coupled to a production environment including a variety of elements and functions.

One production function is referred to as the Script Dicer module 208, which enables script writers to enter their scenes, lines, storyline in a creative, collaborative way to enable actors and producers/directors to seamlessly assemble the video. Such script dicing includes, but is not limited to, tagging/linking each scene, actor line, location, time.

Another production functionality is the Actor Video/Audio Captor module 204, where each participating actor is offered a toolkit used to homogenize the scenes. These kits may be provided for under a variety of scenarios, including for fee or as part of a complementary software development kit. Such kit may include a green/blue/unicolor background screen, microphone, video capturing camera, and/or an illumination light source. Depending on the scene, actors may be given guidance on how to position the camera and illumination source. The actor toolkit may include a driver to seamlessly interface with the CRU cloud.

The Producer/Director Control module 206 functionality component of the CRU platform enables a producer/director to integrate all video elements by making associating actors, cameramen, background video or images, and music to each scene before final editing and production.

Another production function is the music module 210 that enables a musician to upload, create, and edit the soundtrack that is suitable to video scenes. It also includes a database of music tracks from which to select. Such music tracks may be labeled/tagged, and are not necessarily limited, by type, instrument, length, modularity, genre, and so forth.

Still another production functionality is the Background/Stage module 202 which enables photographers, cameramen, artists or amateurs to upload, create, and edit static, animated, or videos suitable for scene background. It also includes a database of such material from which to select, such as when a unique background is not desired. Such background images/videos are labeled/tagged, but not necessarily limited, by type, day time, size, duration (such as for videos), modularity, and genre. Many factors are considered when combining actors' videos with background scenes to homogenize the video. For instance, lighting and camera angle are some factors that are typically taken into consideration during selection and integration process. The system 200 allows artists and amateurs to upload their images and videos using different angles or 360 degree viewing capabilities as it is the case of three dimensional maps.

The system 200, including CRU platforms and services, brings the collaborative video making experience to multiple people without requiring them to go through years of education and experience to penetrate such industry and create new industries based on the creativity and free exploration CRU users enjoy on an individual basis or collectively.

With the proliferation of social networks and video sharing and distribution sites, the systems 100, 200 allow amateur online users to quickly, seamlessly, and collectively combine their ideas and concepts to produce the target video production. In some embodiments a master and slave node hierarchy is used to balance control between online users.

A master user has the responsibility to invite participants, assign roles, and oversee content capturing and production processes. Each user is able to see all contents generated by users in real-time or archived, but only master note is capable of activating a subset of users to interact on given scenes of the video.

In these collaborative systems, a set of tools may include a green/blue background, video/audio capturing mean such as video camcorders, software interface an drivers. The user interface is a Graphic User Interface (GUI) and hardware interfaces which are linked to the CRU.

Figure 4:
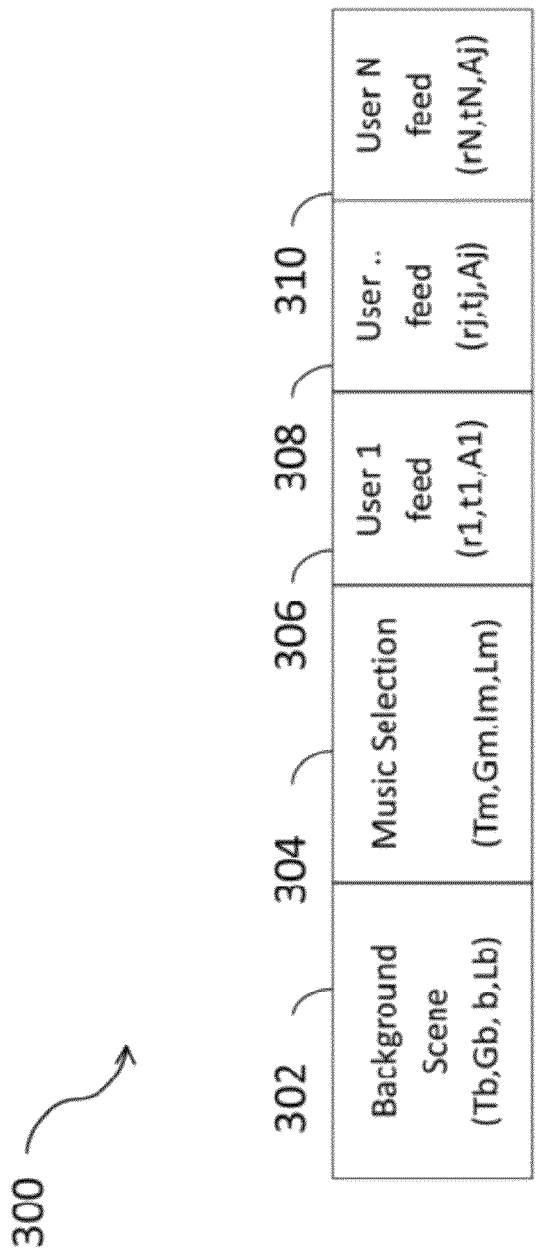
FIG. 4 illustrates an example of various elements within a shot, according to some embodiments.

FIG. 4 illustrates the various video elements according to one embodiment, where variables represent the parameters and features of the video. The video elements are specified by field structure 300 including background field 302, music selection field 304, and user feed fields 306, 308, 310. The Tb/Tm represent the type of background and music; the Gb/Gm represent the genre of the background and music; Db represents anytime of background music; Im represents instruments; Lb/Lm represent duration of background and music; rj represents position; tj represents a time stamp; Aj represents angle and illumination of jth actor. The type of background is identified by the variable Tb. Types of backgrounds include static images such different angles of office or restaurant areas, or video background such as moving car or beach scenes. The type of music is represented by the variable Tm such as suspense, cheerful, sad, or sound effects. The genre, represented by the variable G may include comedy, drama, horror, action, documentary, newsfeed, storytelling, sports, social, or kids. The instrument(s) used in the audio are represented by I. The duration of the background scene or music is represented by the variable L. The position of the actor within a shot is represented as $r_j'$; and the time stamp is represented as $t_j$. The angle and illumination of a jth actor, with respect to a reference is represented as $A_j$. This scenario enables multiple users and allows these users to upload video files.

Editing, integrating, and rendering online video may be accomplished by reducing video quality during the upload process, using distributed servers that process and run specific or general editing, integrating, and rendering requests to recover original video quality. In one embodiment a CRU video editor includes a unique feature that dynamically adapt the video capturing and illumination angles of the different videos that will be eventually combined to create the final scene.

In terms of the services offered using CRU engine. Any user can initiate the video creation process, such as an amateur who can simply post their simple ideas. Such posting may also initiate an alert signal or message to script writers, directors, actors, cameramen, and musicians (other participants) interested in similar ideas to further advance the collaborative video process. Industry players looking to create commercials for their products can use CRU to create competition among users to create winner commercial.

Advertisers of products and services having a relationship to a particular video theme or genre, or desiring to make a connection with a particular audience, are able to advertise their products or services, and act as participants. By incorporating an advertising function provides a revenue stream for video producers. The CRU platform may be provided as a free service to all users at all levels. In some embodiments, users may search certain levels, such as actor, script writer, musician, director level after they achieve a particular goal. In one scenario, the goal may reflect successful accumulation of a number of points. This may be based on the number of released videos from a given user's contributions.

A CRU participant may advertise a video project on the social network(s), where their interest graph identifies potential participants. Social networks may also be used to advertise the video after completion. The CRU may incorporate its own video distribution channels as well as conventional hooks to social media. The CRU engine keeps track of CRU videos activities and revenue regardless of where they reside.

Figure 5:
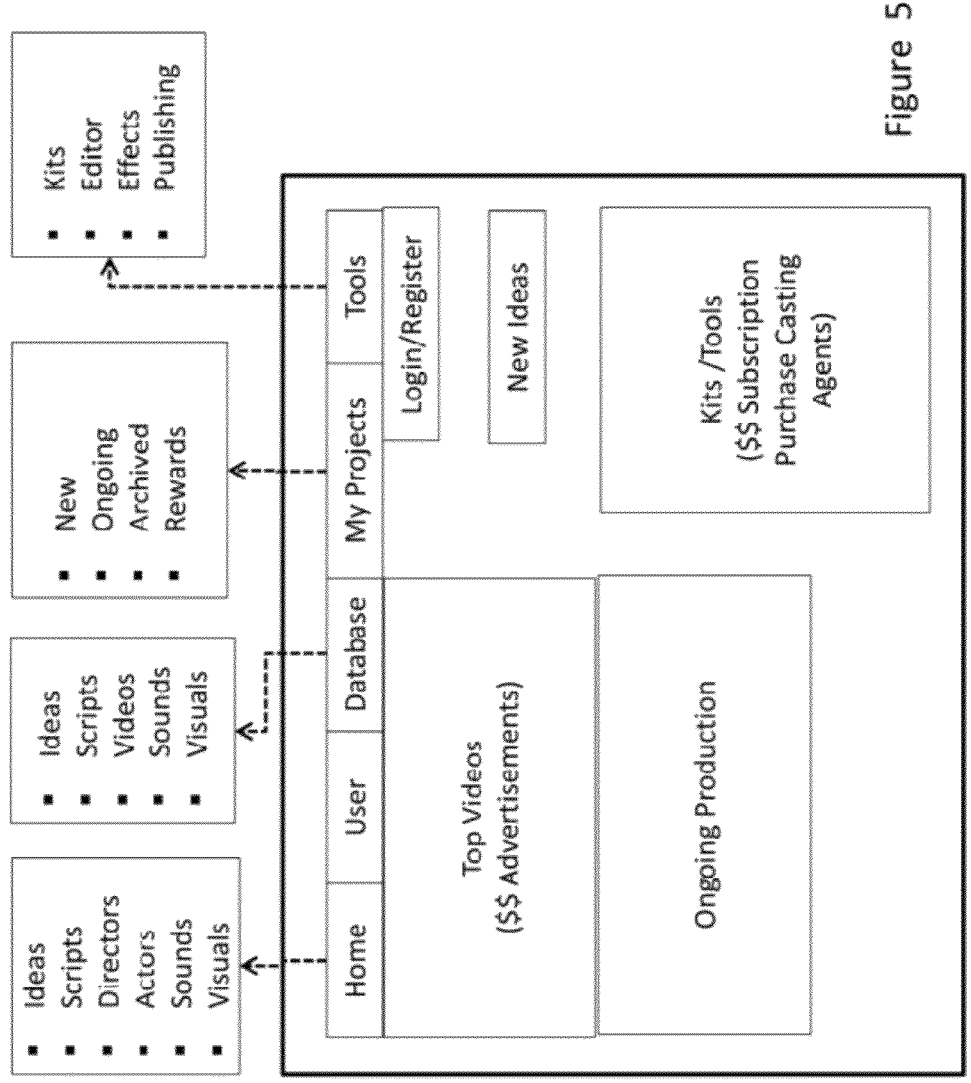
FIG. 5 illustrates an example of a functional block within a main application page, according to some embodiments.

A CRU system may include an internal system to enable CRU users to monetize their contributions and develop a reputation within the CRU community. This will attract others and create groups of users active in the video production business. FIG. 5 illustrates the functional building blocks of a Graphical User Interface (GUI) expressed in a home page 500.

In this embodiment, the home page presents a variety of different functionalities for users. A user may share an idea to solicit interest from script writers, Directors, Actors, cameramen, musicians, sound effect, visual effects, or background scenes and videos. A user may further insert a screenplay script manually or dynamically by uploading script files. The user may select a role, as in selection box 502. For example, a user may select a role as a director, actors, cameramen, sound engineer, score composer, or music content creator, or artist creating visual effects, background images, videos, and so forth.

In one scenario, a director allocates roles based on the script and has the right to modify the script at his leisure while notifying other project members, who also may provide their inputs to the script for the director's review and acceptance or rejection. In this scenario, the director receives the modifications and additions, but has the right to modify the script so as to avoid simultaneous or conflicting changes. Each actor may have multiple insertion points in a script in a given film. Additionally, the script may include lines that will be eventually filled by the actor during video shoots. For example, a director may decide to shoot the same scene using different angles or facial expressions and then decide which ones to use during editing.

A database of information may include multiple partitions, and is used for storing ideas, scripts, names of directors and actors, cameramen, sounds, visuals, which are selected in the: this will be transparent to users as some of them will have access to view and utilize other projects contents, such as after paying a higher subscription fee. This fee may be shared with other users who produced these videos. These elements are accessed by selection of the database selection box 504.

On the homepage GUI 500, users can view cool videos, and then may be encouraged to either register or login to learn about how these videos are created. The homepage 500 further includes tools, accessed through a tool selection box 508. The tools are for development, editing, effects editing, publishing, and so forth.

Casting agents may also be given the opportunity to register and login to view the actor's audition videos and are encouraged to give feedback. Casting agents interested in communicating directly with actors may be asked to pay a fee to access such a service. Such payment scheme may assign fees to be collected when actors purchase their video kits. The kits may be part of the tools, and provided as a development tool kit. The video creation process is presented in a linear fashion, where the users may follow a plan to build the video, or participants may add their portions asynchronously, allowing the video to develop through an iterative process.

Figure 6:
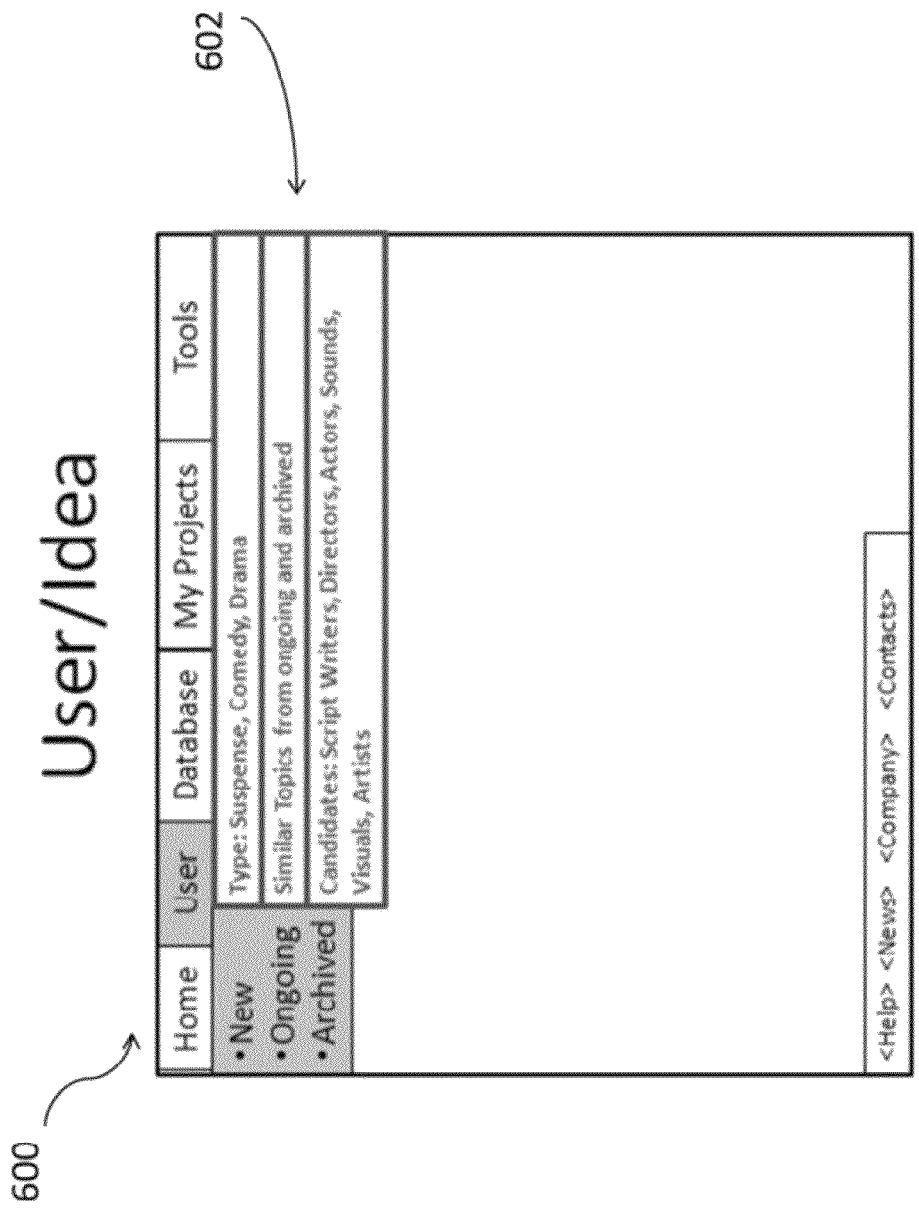
FIG. 6 illustrates an example of various functional elements within a user's idea page, according to some embodiments.

FIG. 6 illustrates a user GUI 600 for inputting an idea for a project. The selection box 602 identifies what type of project to create, whether it is a new project, or continuing an existing one. The user may also select from archived elements to configure a team to build a project.

Figure 7:
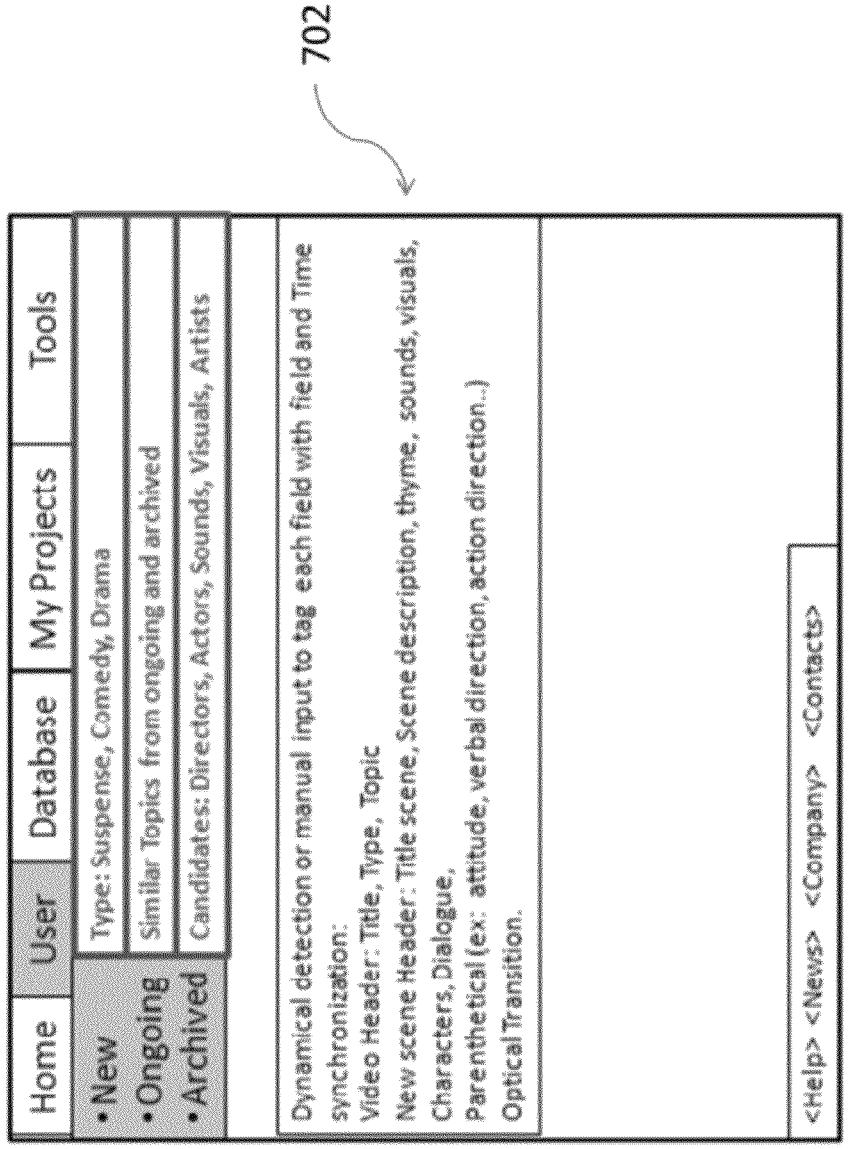
FIG. 7 illustrates an example of a functional block within a script page, according to some embodiments.

FIG. 7 illustrates a user GUI 700 for inputting script information. The script input box 702 may be an area where the user identifies the script specifics, or may be an area to upload a script created off-line. The script may be identified by standard or agreed upon format.

Figure 8:
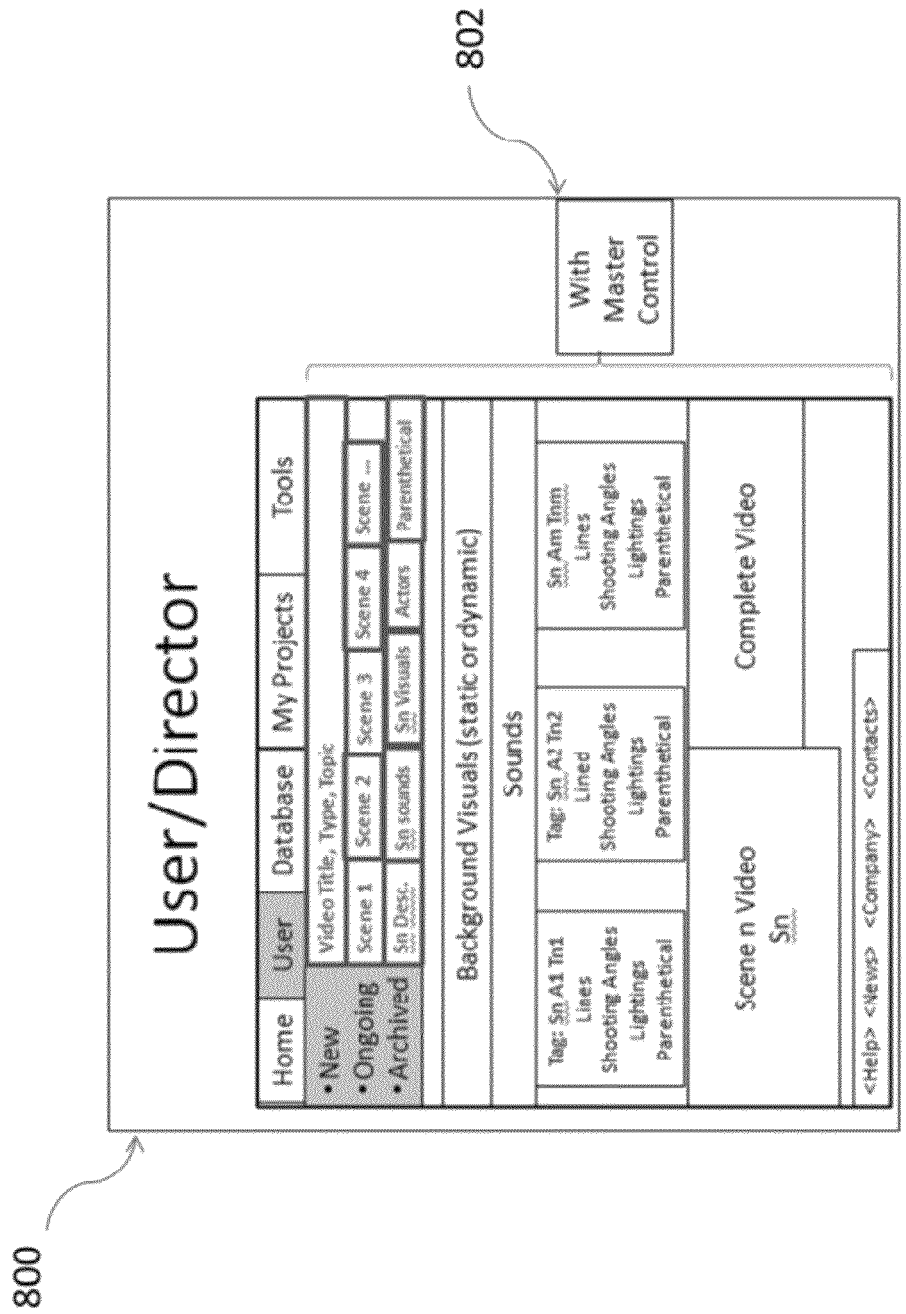
FIG. 8 illustrates an example of a functional block within an Editor (or Director) page, according to some embodiments.

FIG. 8 illustrates a user GUI 800 for inputting director's instructions, guidance and notes. The director creates a group of insertion points. As illustrated, the director's GUI 800 identifies a group Sn Al TnI that refers to actor Al in nth scene ore shot at time start TnI. The group is a collection of points that the director has created that will be filled by video of actors which may be filmed later. Actors and other project members can view the project at any time but may have no rights to modify contents except for their own contributions. The director acts as the master participant and has higher authority and control than other participants. Master control portions 802 identify those areas that are used to implement the director's decisions. The director will specify the particular components for each scene, as well as the participants and their roles. Director and editor roles may be identical in this novel online application.

Figure 9:
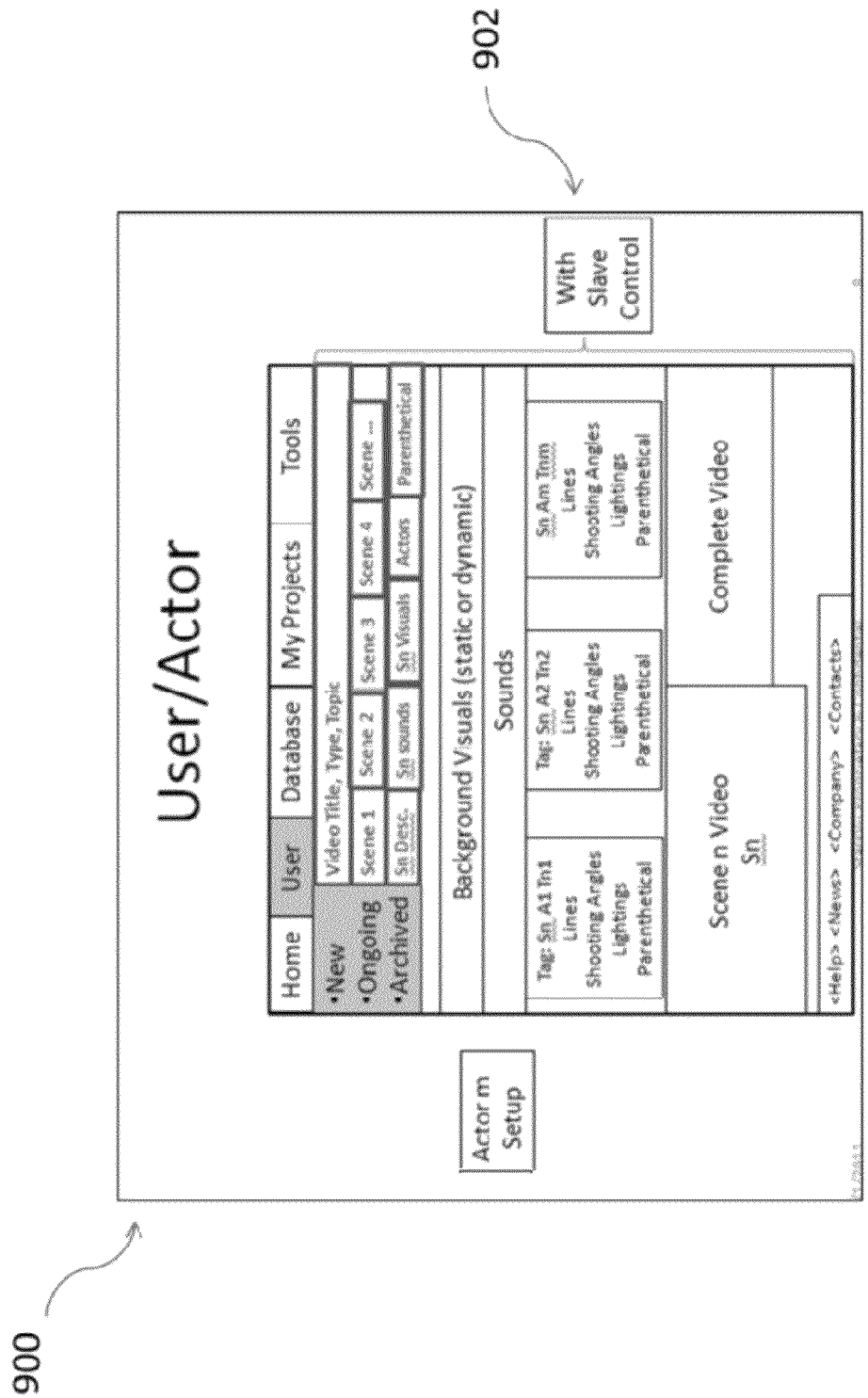
FIG. 9 illustrates an example of a functional block within an actor page, according to some embodiments.

FIG. 9 illustrates a user GUI 900 where the actors may respond to control instructions of the director. The actor acts as a slave to the directions of the director. The slave control portions 902 identify those areas that actors use to implement the director's instructions.

Actors use the recommended video kit elements to record the different videos assigned by director. The GUI will guide them on where to position the light, camera, and other items such as fan, eyeglasses, item in hand. As illustrated in FIG. 9, the user GUI 900 presents options to the actor to select a scene, sounds, and so forth. This illustrates the slave mode of the system, which allows actions in response to the master. For voice over functions the user may play the video and add the voice when appropriate, such as in an animated project.

Figure 10:
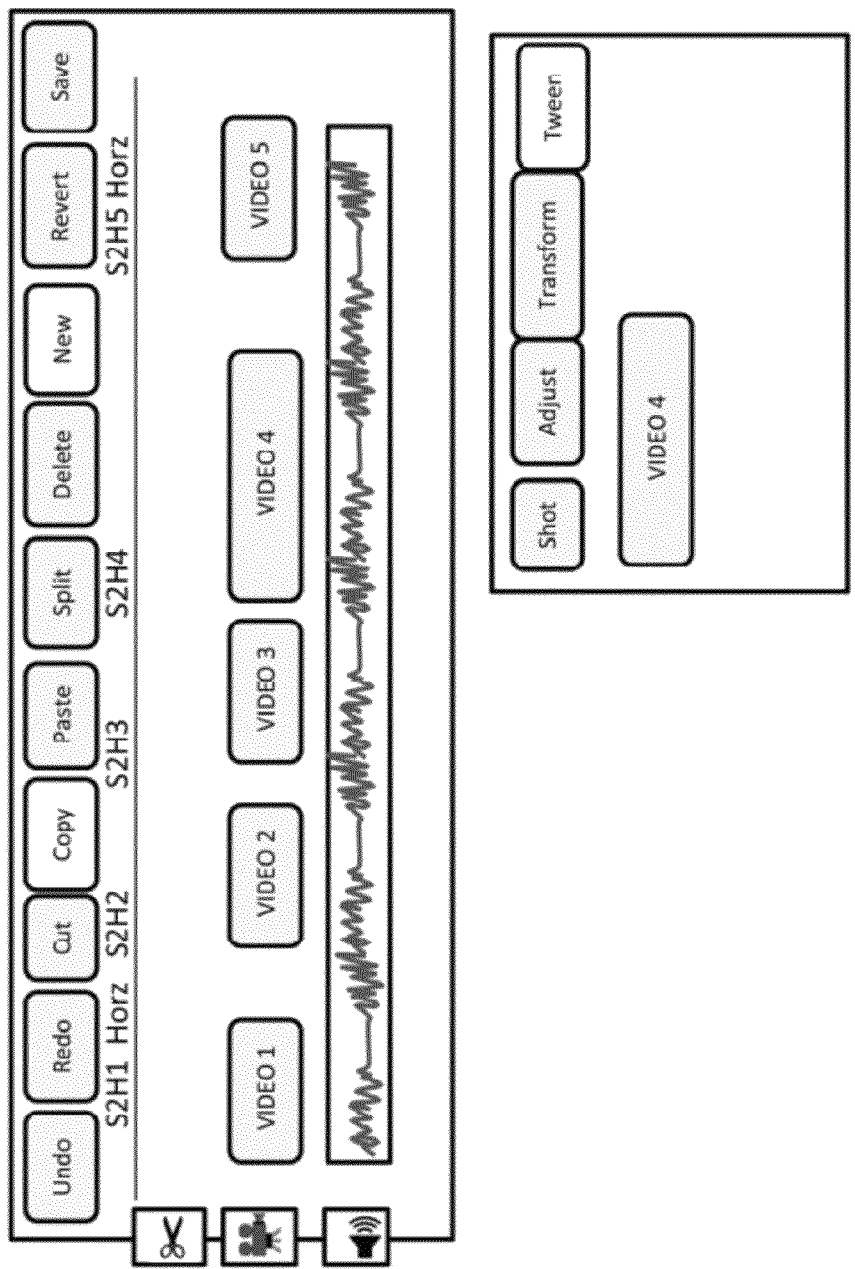
FIG. 10 illustrates an implementation example of a script within a video editor, according to some embodiments.

In one embodiment, illustrated in FIG. 10, a video project is put together to illustrate multiple video portions and application of the audio portions. Textual information may be provided to instruct actors are other participants. An "auto" button may be checked to allow the video editor to automatically adapt to uploaded video durations. Various fields may be used to label each shot as part of a given scene. Adjustment controls, such as horizontal, vertical, and deep sliders may be used to provide actors with desired shooting angles. In the present example, the camera is shooting horizontally from −14 degree angle and the shot duration is set to 1.8 seconds. The script dialogue, shots, and actions are embedded into the video editor.

Figure 11:
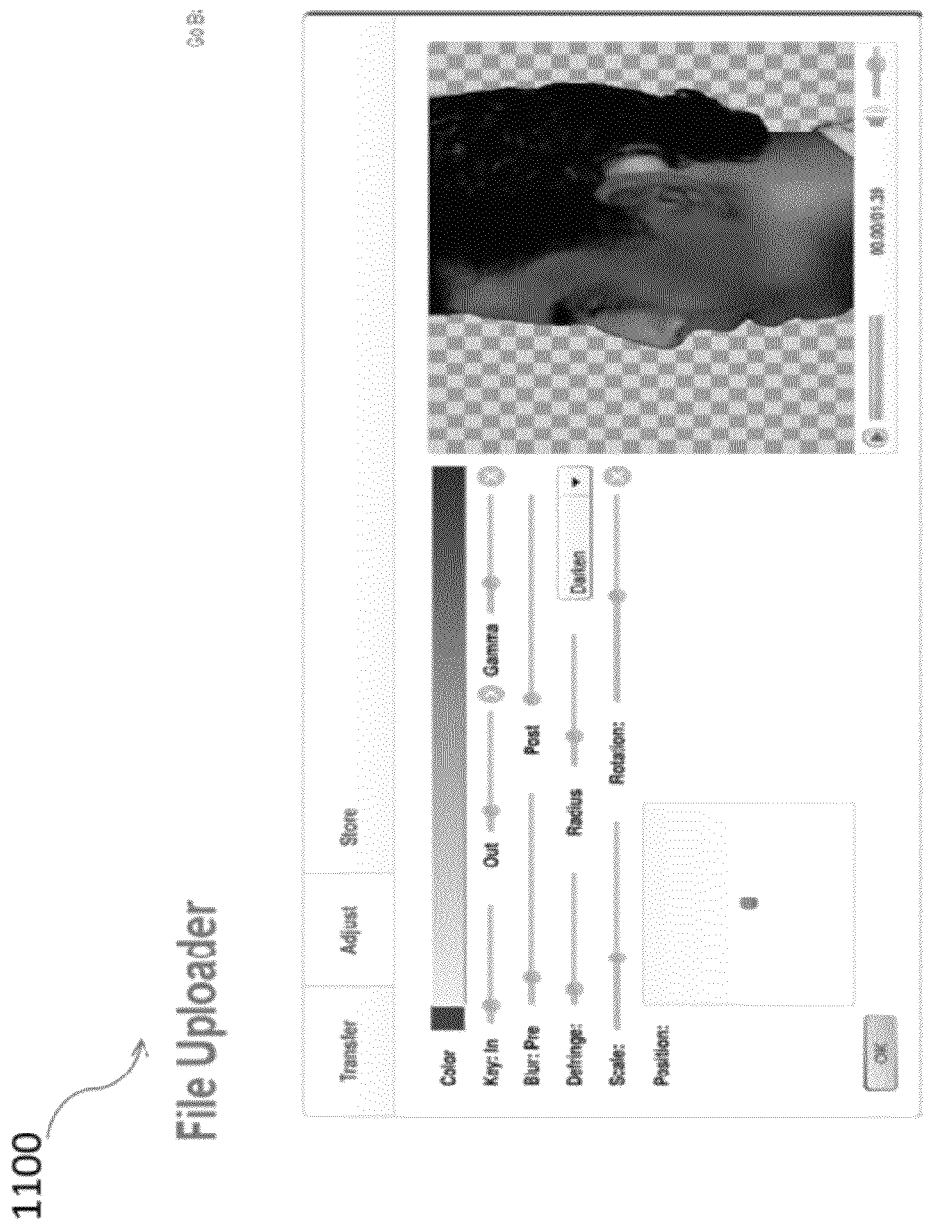
FIG. 11 illustrates an example of a file Uploader with Chroma keys to illuminate green or blue background color, according to some embodiments.

FIG. 11 illustrates one example of a video file uploader 1100 equipped with functionality to modify a green screen or blue screen. As illustrated, the uploader 1100 includes various sliders and adjustment mechanisms. The uploader 1100 may be used to remove the green or blue background of an uploaded video. In one example, a user may drag a color square along the green shade spectrum or along the video itself, and in this way, reduce, eliminate or adjust the green/blue color of the background. The video file uploader 1100 is adapted to upload a user's files where general files may be uploaded to video production general folders. These general files are added to web application general database. A user selects destination of files associated with a shot to include them in the corresponding script section in video timeline. A user is able to remove green and blue backgrounds of uploaded videos. A user is able to trim videos to comply with the script, and adjust according to a timeline. A user is able to edit videos and may upload video file that includes multiple shots while indicating start and end times of each shot or scene.

Figure 12:
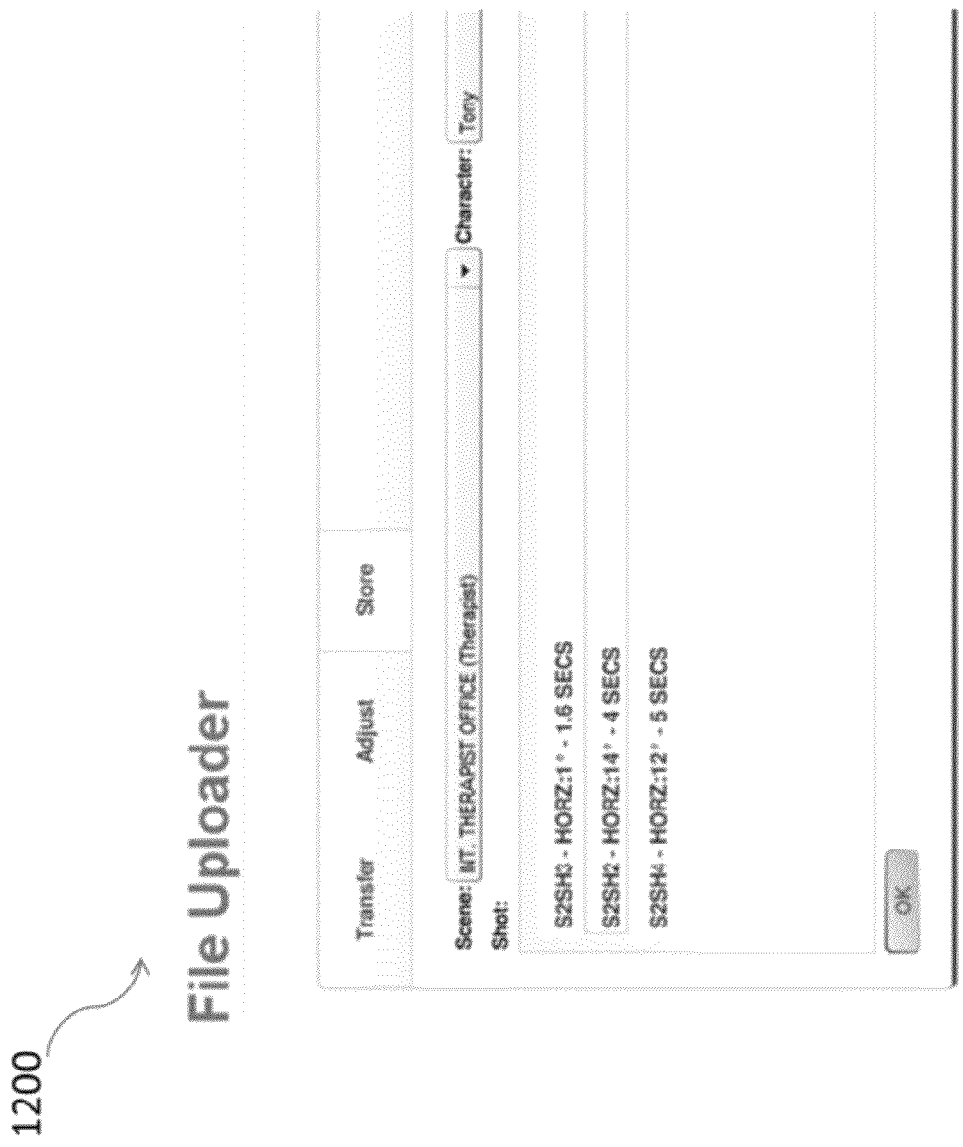
FIG. 12 illustrates an example of a Filer Uploader assigning uploaded videos to target shots within an embedded script in a video editor, according to some embodiments.

FIG. 12 illustrates the uploader GUI 1200 for storing the video. The uploader 1200 provides users with the scenes, shots, and character selection. The uploader GUI 1200 may include a variety of configurations, such as identifying the timing on a timeline for placement of the uploaded content.

Figure 13:
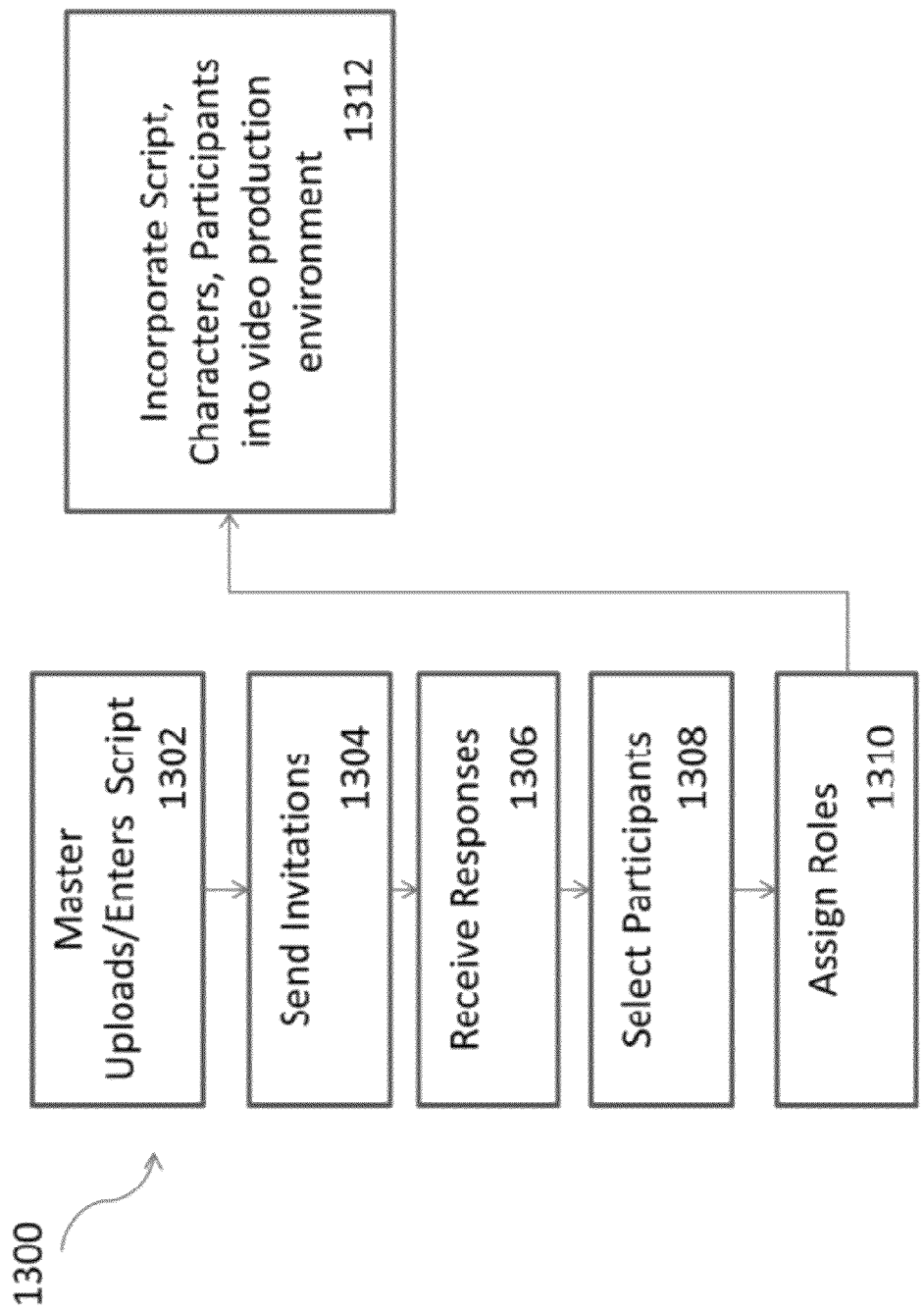
FIG. 13 illustrates a method for producing a multimedia project, according to our embodiments.

FIG. 13 illustrates a method for generating a multimedia project according to an example embodiment. The method 1300 starts with a new video idea or master uploading or entering a script, operation 1302. The uploading may be done by a user initiating a project or may be in response to a request received from a director or other project initiator or owner. If the script is uploaded, the system works to extract script component information and apply this information to a timeline for the project. The extracted or entered components may include scenes, shots within scenes, commands, comments, characters, characters assignments, dialogue and character lines. The participant may then send out invitations to potential or desired participants, operation 1304. The invitations may be posted on a designated website, may be sent out to individuals through email, social network, professional network or other community communication network. These invitations may be to fill specific roles, such as characters, and may also be for technical editors, video editors, script writers, photographers, and other roles needed for collaboration on the project. Responses are received through the system, operation 1406. The participant may then select other participants from the responses received, operation 1308. The participant may request further information, similar to auditions, so as to complete the selection process. The process then assigns roles, operation 1310. The collaboration is then incorporated into the multimedia production environment. The script is effectively overlaid on a timeline and characters per scene are placed at the time when their action occurs. This allows collaborators to add their contributions to the correct position in the project. In one embodiment, the script is tagged and the components each have a unique identifier. When other collaborators build and create content and contributions, the systems tags these so that they are seamlessly added to the project. In this way, video for a given scene or corresponding shots is uploaded and mapped into the project at the correct slot in video editor timeline. In some embodiments, the user merely posts the contribution to the project and the system reads the contribution tags and incorporates according to the tag. Tagging allows the system to automatically perform steps that were done manual in previous systems and solutions. This allows the system to incorporate script components into the video production environment or other multimedia production environment.

In these and other embodiments, a video production web application incorporates a collaborative environment providing invitations to participants, similar to a call for papers or review in an academic setting. The invitation may be provided to a designated group or to a general public audience. The master initiates a session by uploading or incorporating a script to the system, thus triggering an invitation mechanism to invite users to participate in video application. The script may include characters, scenes, shots within scenes, commands, dialogues, actions, and comments. The Invitation is sent to potential participants. This may involve sending an email to a user account, or to a social media contact. In one embodiment, the invitation is posted for review and acceptance by multiple potential participants, such as posting on a social media site. For example, a director may assign the producer role to a video production owner, who then selects crew from respondents. The producer then assigns roles to individual participants selected from the respondents. If there are no satisfactory respondents, then the producer or master may send out a specific invitation to one or more desired participants to fill a role.

Figure 14A:
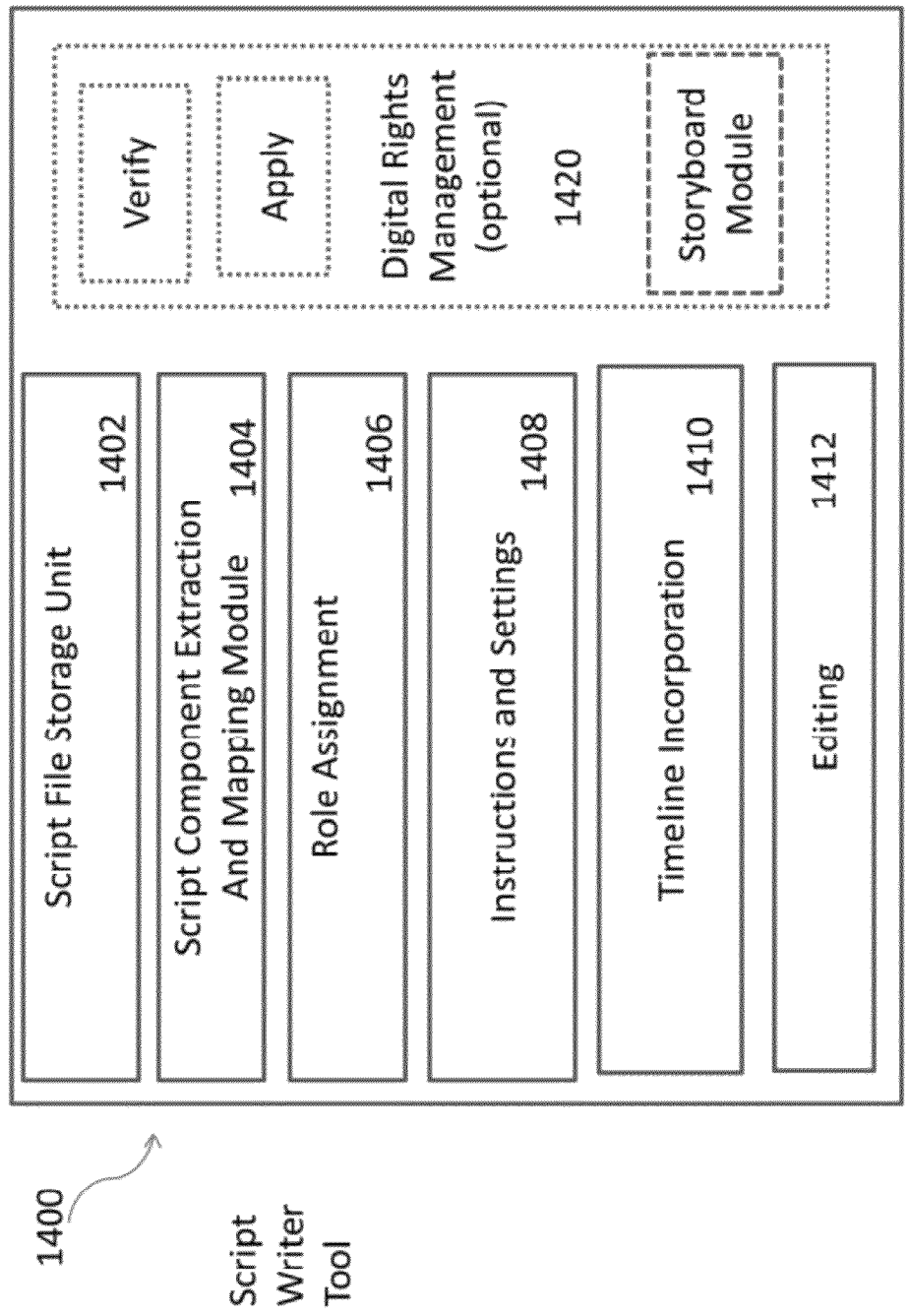
FIGS. 14A and 14B illustrate a script writer tool and intake tool, according to an example embodiment.

FIG. 14A illustrates a script writer tool 1400 that includes modules for script file storage 1402, script component extraction and mapping module 1404, character selection and role assignment 1406, instructions and settings 1408, timeline incorporation of the script components 1410, and editing the script 1412. The character selection includes both the original character creation as well as assignment of that character to a participant. The scenes may be a collection of video shots, or master created scenes. The scene may specify the background, descriptions and flavor of the scene. Technical directions may include the shots to take for a given scene and sequence, as well as camera angles, lighting specifics, and so forth. The script writer tool 1400 allows the master and other participants to add commands and comments to the various scenes, characters and other instructions. Authenticated users may access the script in a file format.

The script writer tool 1400 is used to create, edit, and modify the components of a script, such as action, command, and dialogue. The action describes the scene and motions, the command provides further instructions, while the dialogue provides the lines the characters speak. In one embodiment, the dialogue is provided on the scene for adding in audio after filming, such as karaoke videos.

The script writer tool 1400 enables the script writer to format according to multiple aspects, such as to adjust the typeface/font, line spacing and type area, language, as well as to specify the page per minute of screen time. This enables the script writer to adjust the script according to venue, such as for an American or European movie. The script writer may further edit according to prose, such as to focus on audible and visual elements. The prose selected by the script writer will provide explanations for the participants.

The script writer tool 1400 may further include a storyboarding module to enable the script writer to develop a story line which can be translated into the final video scenes. The storyboard module may start with an editable template that enables the user to quickly build a story line, such as to have drag and drop features, people, actions, and scenes. The storyboard module may be useful in creating an animated portion of a movie or an entire animated movie.

In one embodiment, the script writer tool 1400 includes a digital rights management module, 1420 which may incorporate multiple modules. A first module may be used to verify the material incorporated into the script is not infringing the copyrighted material of others, such as to compare to a database external to the script writer tool 1400. A second module may be used to apply a Digital Rights Management (DRM) security mechanism, such as encryption or other means.

The script file storage unit 1402 stores the script created and uploaded by a writer, director or other with privileges allowing inputs to the script. The script file may be edited by multiple authorized collaborators. Each script includes a variety of components, such as characters, scenes, actions, background, music and audio information and so forth. The script component extraction module 1404 identifies these components in the script file and uses this information to identify the roles that will be used to prepare the video film project. For example, the script component extraction module 1404 identifies a character, and then enables the director or casting director to select a collaborator to fill this role. The selected collaborator, or actor, is then given privileges which allow the collaborator to access the script, the characters lines, definition and actions, as well as to upload their contributions. In this example, the actor's contribution may be a video of the actor acting out their lines. The script component extraction module 1404 identifies the time when the actor's lines are to occur in the video project.

The script component extraction module 1404 creates various files for the components of the script file. These files are then used to compile the contributions of the various contributors into a final product. The script component extraction module 1404 works in coordination with the timeline incorporation module 1410, which receives the contributions of the collaborators and incorporates them into the timeline. In this way the script provides the plan for the video project. The components include characters, instructions, settings, and definitions, wherein the collaborators use the components to create their contributions. The received contributions are then implemented into the video project.

The script writer tool 1400 enables collaborators to edit the script, when the collaborator has editing privileges. The editing module 1412 enables such editing of the script file. There are a variety of ways for multiple collaborators to edit the script. In a first embodiment, the collaborator edits are identified as changes to the script. The director may accept or reject the edits. The edits may be presented to multiple collaborators for group acceptance and discussion. Once accepted, the edits become part of the script.

Figure 14B:
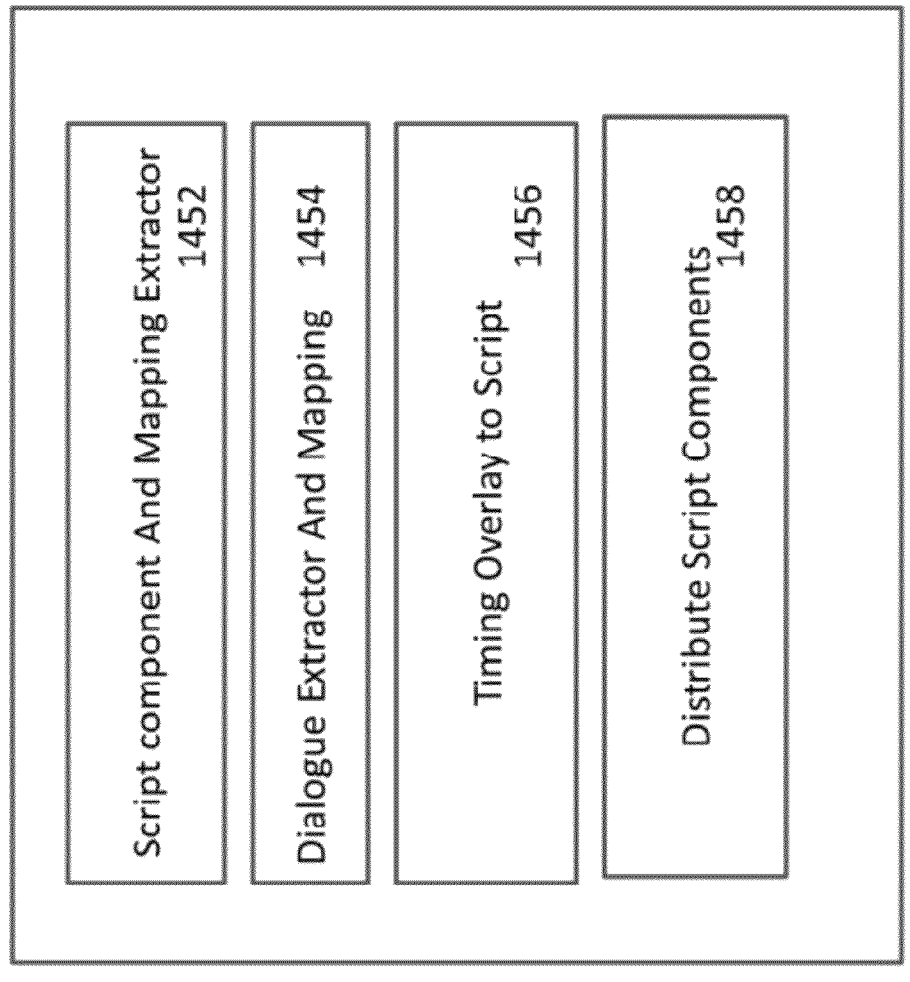

FIG. 14B illustrates an embodiment of a script intake module 1450 which receives the script creations and components from the script writer tool 1400 and extracts information from the script for distribution throughout the collaborators. This enables each participant to provide their portion of the movie while understanding the context and other components of the production. The script intake module 1450 includes a script component extractor 1452 and a dialogue extractor 1454, which extracts the characters and dialogue from the script. These components are stored accordingly and role assignments are applied. For example, a main character is associated with that character's scenes and lines in the script. The participant selected as the main character will be authorized to access this information. The actor will further be able to upload their video and audio portions. A module 1456 applies the timing overlay to the script, by coordinating the script to the timeline. The script intake module 1450 further distributes the script components, such as lines, timing, technical features, and so forth to the collaborators.

Figure 15:
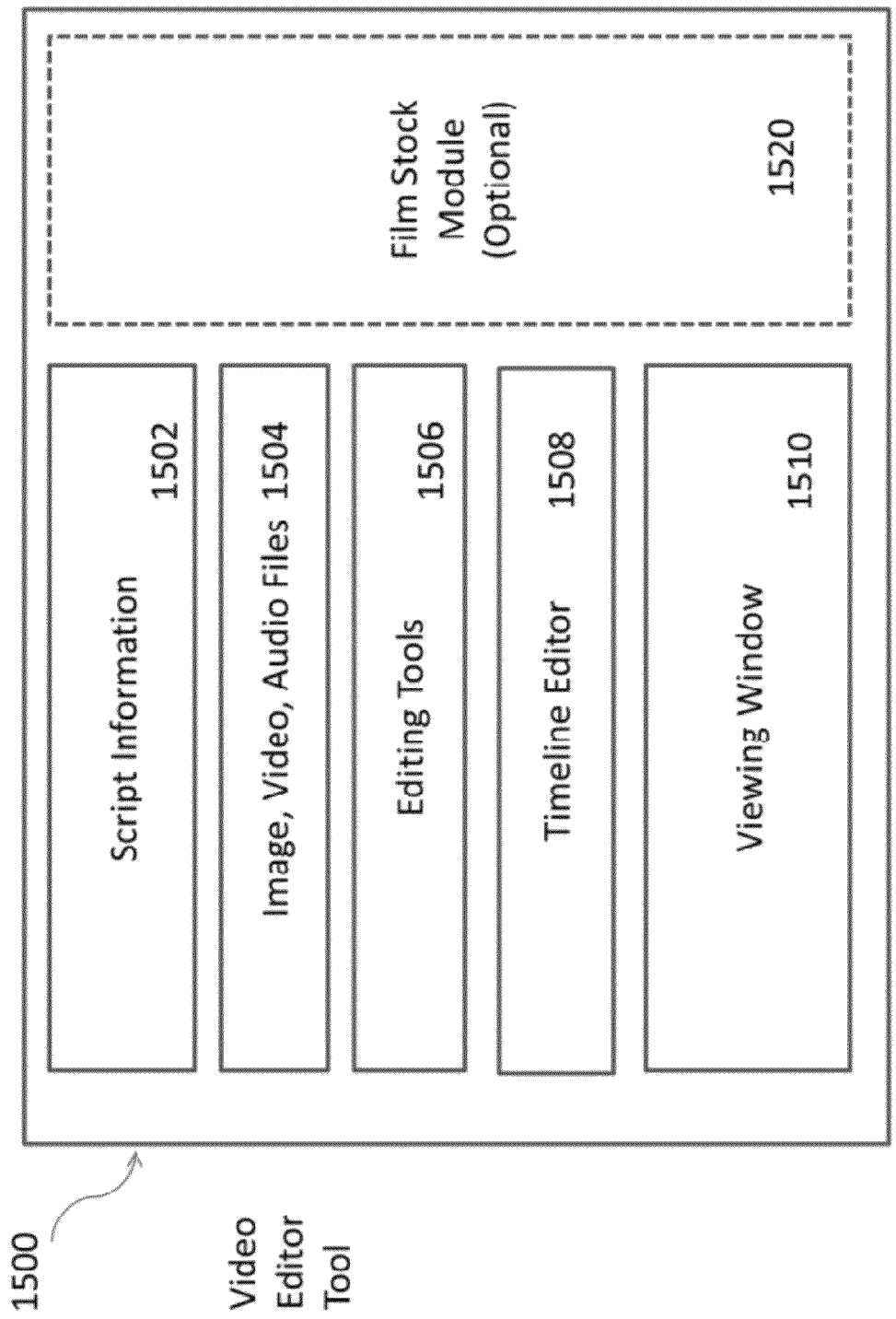
FIG. 15 illustrates a video editor tool, according to an example embodiment.

The system adds the results of the script writer tool 1400 to the video production environment, and adds scenes, shots, and characters to the video production page. FIG. 15 illustrates a video editor 1500, having modules for script and related information 1502, image, video and audio file handling 1504, editing tools 1506, timeline editor 1508, and video viewing window 1510. A user may select a scene from the video production page to edit shots and to assemble the scene. The user may add transitions between scenes. The final video is rendered to its original video quality after all scenes are successfully assembled. An optional film stock module 1520 may be included to access film stock available either freely or for fee. Such film stock may be incorporated into the movie.

As social media and mobile applications have exploded with the introduction of ever smarter smart phones, the present techniques of merging script information with video/audio project information in a collaborative environment is particularly vital. FIG. 16 illustrates a mobile device display screen 1600. The mobile application for the collaborative video production product provides a video display portion 1602, timeline portion 1604 which corresponds to the video displayed, and a control portion 1606. The control portion 1606 may include a variety of controls, from drag and drop instructions that allow the user to edit the video by dragging control elements to the video to social network interfaces that allow sharing of the video editing real time. In one scenario the video or multimedia project is displayed for multiple users in real time. The collaborators may discuss the video using their mobile devices, or one or more collaborators may be using their PC or other computing or mobile device. In one embodiment a user having a mobile e-reader may send script or other information to other users from the e-reader. Some mobile devices have capability to perform readability and other statistical calculations, which may be performed on the video project and then provided as feedback to other users. Still other embodiments may provide analysis and use information which may be used to refine the video project, or to identify advertisers. In one embodiment, the collaborators access a third party service which identifies images in the video project and match these to brands and products. This information may be used to procure advertising revenue from these companies. Still further, the mobile application may connect to social media allowing easy upload and presentation on Internet and other applications. The collaborators may solicit feedback and suggestions from viewers to refine and improve the video. The mobile application may store the video project and associated data in a cloud environment, where multiple collaborators can access and edit the project.

In one embodiment templates are provided on which a multimedia production may be built, such as for a horror movie, the various scene selections may be provided as well as character information, scary voices and noises, as well as links to information on this genre. Users may also build templates, such as for a series of movies or productions with a common theme, such as a science series. Educators may use the collaborative system to build projects with students, where the educator enters the script information, which may narrative or text book scripting such as for a documentary, and students access this information and add to the project. The end result is a multimedia presentation illustrating concepts learned.

Sports casters may use such a system to incorporate footage taken by local photographers and incorporate into nationwide or worldwide video feeds, and other projects. The sports caster provides a script identifying the information desired for the video or sports cast, identifying specific views from specific locations, footage of specific teams and players, and so forth, wherein the sports casters send out a request of participants. As local participants respond, they are able to send their video footage to the sports caster specifically identifying which information they are providing. The sports caster does not have to go through the videos to manually position in the film, but they are already marked according to their location on the timeline according to the script. The editor then merely watches the films to select the one desired.

Partnership-Based Revenue

When movie fans, amateurs, want-to-be actors, cameramen, directors, editors, special effects, artists, musicians, and so forth, all join forces to create their own video production with unlimited freedom, a whole new generation of video content emerge. By including interaction with script writers during the production process, the script is seamlessly embedded into the video editor to balance tasks among production team. The outcome is a diverse and global user community that includes students, writers, actors, cameramen, artists, filmmakers, musicians, educators, journalists, travelers, activists, sports enthusiasts, and bloggers—basically anyone who wants to create original video content. A variety of new types of partnership-based revenue are enabled by this novel collaborative online video production system. Actor Kit Vendors, such as companies selling Video camcorders, green/blue screens, external microphones, and Lighting, may use the collaborative system to enable sale of their goods. Advertisers may advertise on the system for consumer goods, media sites, movie & TV releases, and events, specifically targeted at the video creators and may advertise on the resultant video. Service Providers may include talent agencies, talent coaches, art schools & programs. Industry Productions may create commercial videos, host best video competitions, as well as to provide advertisements, announcements, tutorials, training materials, news feeds, and travel videos. Cable networks may license such application to produce its video ads and content.

While various DPM and CRU configurations and elements are illustrated and various apparatuses are configured in accordance with one or more features described in this disclosure, it is understood that many modifications and variations may be devised given the above description. The embodiments and examples set forth herein are presented so as to explain the present invention and its practical application and to thereby enable those skilled in the art to make and utilize the invention. However, those skilled in the art will recognize that the foregoing description and examples have been presented for the purpose of illustration and example only. The description set forth is not intended to be exhaustive or to limit the invention to the precise form disclosed. Many modifications and variations are possible in light of the above teaching without departing from the spirit and scope of the following claims.

What is claimed is:

1. A method for creating and editing a video project by collaborators using a computing device, comprising:
    receiving screenplay script data, the screenplay script data including a plurality of screenplay script elements;
    identifying at least one of the plurality of screenplay script elements;
    script dicing the screenplay script data to obtain at least one diced element;
    embedding the at least one diced element in a video editor timeline track for the video project, wherein an editing panel is displayed when a shot clip is selected, the editing panel comprising a background continue toggle element that allows for background clip from a previous shot clip to be continued, a background drop well element that allows visual clips to be dragged, character menu, a file selection media browser, a layer button set that offers ability to send character frontwards or backwards, a trim control that allows trimming of selected file from beginning or end, an offset control that allows incremental resequencing of a selected file, hue, saturation, contrast and brightness slider controls, a position control that allows character to be moved onscreen, and a resize control that allows character to be sized onscreen;
    displaying the timeline track information alongside portions of the video project;
    enabling editing of the video project by accessing the at least one diced element in the timeline track;
    sending an invitation for participants for the video project;
    receiving responses to the invitation;
    selecting a set of participants to create the video project;
    authorizing each of the set of participants for their task in creating the video project; and
    assembling the video project with the portions of the video project.

2. The method as in claim 1, further comprising:
    assigning roles for the video project to the set of participants.

3. The method as in claim 1, wherein the screenplay script elements include scenes, shots within scenes, commands and comments.

4. The method as in claim 3, wherein the screenplay script elements further include characters, characters assignments, and character lines.

5. The method as in claim 3, wherein the screenplay script elements further include instructions for movement, camera and lighting angles, time duration and actions for actors.

6. The method as in claim 1, wherein roles for the video project include a producer and at least one additional user.

7. The method as in claim 6, wherein the additional users can be actors, cameramen, editors, musicians, or artists.

8. The method as in claim 1, wherein the screenplay script data is uploaded as a file.

9. The method as in claim 8, wherein the method is a collaborative method for creating the video project, the method further comprising:
    receiving contributions to the screenplay script data; and
    incorporating the contributions into the screenplay script data.

10. The method as in claim 1, wherein the screenplay script data is entered into the video editor timeline track so as to enable:
    displaying an editing panel associated with screenplay script elements in response to selection of a video element in the timeline track.

11. A method for preparing a digital video film, the method comprising:
    receiving a script file, the script file comprising scenes and timing for portions of the digital video film;
    extracting screenplay script information from the screenplay script file, the screenplay script information comprising scenes and timing for at least portions of the digital video film;
    incorporating the screenplay script information into a timeline for the digital video film;
    displaying the timeline alongside at least a part of the screenplay script information, wherein an editing panel is displayed when a shot clip is selected, the editing panel comprising a background continue toggle element that allows for background clip from a previous shot clip to be continued, a background drop well element that allows visual clips to be dragged, character menu, a file selection media browser, a layer button set that offers ability to send character frontwards or backwards, a trim control that allows trimming of selected file from beginning or end, an offset control that allows incremental resequencing of a selected file, hue, saturation, contrast and brightness slider controls, a position control that allows character to be moved onscreen, and a resize control that allows character to be sized onscreen;
    assigning components of the screenplay script information to at least one participant;
    making the components available for access by the at least one participant; and
    assembling the components into the digital video film.

12. The method as in claim 11, wherein the components include dialogue information.

13. The method as in claim 12, wherein the components include metadata, motion and action information.

14. The method as in claim 11, wherein the components include commands and comments.

15. The method as in claim 11, wherein the timeline comprises a plurality of scenes and shots and the motion, camera and lighting angles, time duration, metadata, and action information to instruct actors as to their position and movements during at least one of the plurality of scenes.

16. The method as in claim 11, further comprising:
    receiving collaboration files from the participants; and
    incorporating the collaboration files into the digital video film.

17. The method as in claim 11, further comprising:
    receiving an audio file from one of the at least one participant; and
    incorporating the audio file into the timeline for the video.

* * * * *